(12) United States Patent
Gwon

(10) Patent No.: US 9,211,655 B2
(45) Date of Patent: Dec. 15, 2015

(54) APPARATUS AND METHOD FOR SEPARATING LAMP OF VEHICLE FOR RECYCLING

(71) Applicant: Hyundai Motor Company, Seoul (KR)

(72) Inventor: Jae-Soo Gwon, Yongin Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 196 days.

(21) Appl. No.: 13/936,722

(22) Filed: Jul. 8, 2013

(65) Prior Publication Data

US 2014/0223716 A1    Aug. 14, 2014

(30) Foreign Application Priority Data

Feb. 8, 2013 (KR) .......................... 10-2013-0014540

(51) Int. Cl.
*F21S 8/10* (2006.01)
*B29B 17/02* (2006.01)
*B29L 31/00* (2006.01)
*B29L 31/30* (2006.01)

(52) U.S. Cl.
CPC ................ *B29B 17/02* (2013.01); *F21S 48/00* (2013.01); *B29B 2017/0203* (2013.01); *B29B 2017/0217* (2013.01); *B29L 2031/30* (2013.01); *B29L 2031/747* (2013.01); *Y02W 30/56* (2015.05); *Y10T 29/49815* (2015.01); *Y10T 29/53983* (2015.01)

(58) Field of Classification Search
CPC ............ B29B 17/02; B29B 2017/0217; B29B 2017/0203; F21S 48/00; Y02W 30/56; B29L 2031/30; B29L 2031/747; Y10T 29/49815; Y10T 29/53983
See application file for complete search history.

(56) References Cited

FOREIGN PATENT DOCUMENTS

| KR | 10-2001-69218 | | 7/2001 |
|---|---|---|---|
| KR | 20000048915 | * | 3/2002 |
| KR | 10-2003-43431 | | 6/2003 |

* cited by examiner

*Primary Examiner* — John C Hong
(74) *Attorney, Agent, or Firm* — Mintz Levin Cohn Ferris Glovsky and Popeo, P.C.; Peter F. Corless

(57) ABSTRACT

An apparatus that separates a lamp of a vehicle that includes a separating unit configured to separate a lamp and a driving unit installed within a power chamber disposed at a lower portion of the separating unit. The driving unit also includes a motor that moves a rotating plate installed at the separating unit and a first clamp.

5 Claims, 3 Drawing Sheets

APPARATUS AND METHOD FOR SEPARATING LAMP OF VEHICLE FOR RECYCLING

CROSS-REFERENCE TO RELATED APPLICATIONS

This application claims priority under 35 U.S.C. §119 to Korean Patent Application No. 10-2013-0014540, filed on Feb. 8, 2013, in the Korean Intellectual Property Office, the disclosure of which is incorporated herein by reference in its entirety.

BACKGROUND

1. Field of the Invention

The present invention relates to an apparatus and method that separates a lamp of a vehicle, and more particularly, to an apparatus that separates a lamp of a vehicle, including a separating unit disposed at an upper end of the apparatus and configured to separate a lamp, and a power unit disposed at a lower end of the apparatus and having a motor that moves a rotating plate installed at the separating unit and a clamp.

2. Description of the Related Art

In recent years, regulations on treating end of life vehicles, which are being legislated in various countries throughout the world such as, Korea, Japan, and China as well as the European Union (EU), require recycling from about 85% and heat recovery from about 95% of total weight of various materials produced from the end of life vehicles.

In a case of a lamp of a vehicle, since a front side lens of a head lamp is made of a polycarbonate (PC) material, and a housing for fixing the front side lens is made of a polypropylene (PP) material, recycling thereof is important. Further, since a bezel installed within the lens and a reflective plate are made of high priced engineering plastics, resources may be saved, and costs may be reduced when recycling thereof is performed. Moreover, in a case of a rear combination lamp, front and rear sides thereof are made of polymethyl methacrylate (PMMA), and magnesium is also used in the lamp of a comparatively high priced vehicle.

However, in the lamp of a vehicle, since the lens, the bezel, the reflective plate, or the like is adhered to the housing using sealant or attached to the housing by welding to secure and maintain performance of water tightness, it may be difficult to separate the components for recycling, and as a result, the entire lamp is discarded without being recycled.

SUMMARY

The present invention provides an apparatus and method that separates a lamp of a vehicle for recycling, capable of easily separating each component used in the lamp.

An exemplary embodiment of the present invention provides an apparatus that separates a lamp, including: a separating unit configured to separate a lamp; and a driving unit installed within a power chamber disposed at a lower portion of the separating unit and having a motor that moves a rotating plate installed at the separating unit and a first clamp, in which the rotating plate is installed on a work table of an upper plate of the power chamber, a base on which the lamp to be separated is mounted and is attached to the rotating plate, the first clamp and a second clamp, which stably fix the lamp mounted on the base, may be installed on the base, a support rod may be installed on the work table, a coupler, which is vertically movable, is installed at the support rod, and a cutting tool, which cuts the lamp, may be attached to the coupler.

The apparatus that separates a lamp according to an exemplary embodiment of the present invention, which is configured as described above, may easily separate an engineering plastic such as polycarbonate (PC), an ABS resin, polymethyl methacrylate (PMMA), or the like, which is a plastic used in the lamp, by cutting and separating a housing part that attaches the lens with a lens part of the vehicle lamp, such as a head lamp, a rear combination lamp, a fog lamp, or the like, and therefore it may be possible to recycle the lamp instead of discarding the entire lamp and to reduce manufacturing cost for the vehicle lamp.

In addition, purity of components may be further improved by preventing a sealant, which is used to attach the components of the lamp, from remaining on the lamp when separating components of the lamp.

Furthermore, the apparatus may include the rotating plate, which adjusts a cutting tool and a cutting blade using a tool arm and rotates the lamp. Additionally, the first clamp and the second clamp in which a width between the first clamp and the second clamp may be changed based on a length of the lamp to stably grip the lamp may be installed. A suction device that suctions dust generated during the process of separating the lamp may be installed, and thus, the operation of separating the lamp may be easily performed and safety of the operation may be secured.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a configuration of an apparatus that separates a lamp of a vehicle according to an exemplary embodiment of the present invention will be described in detail with reference to the drawings. However, the accompanying drawings are provided as examples in order to fully transfer the spirit of the present invention to those skilled in the art. Therefore, the present invention is not limited to the accompanying drawings and may be implemented in various forms.

Further, unless terms used in the present specification are defined, the terms have meanings commonly understood by those skilled in the art to which the present invention pertains and known functions and configurations which may unnecessarily obscure the scope of the present invention will not be described in detail in the following description and accompanying drawings.

Figure 1:
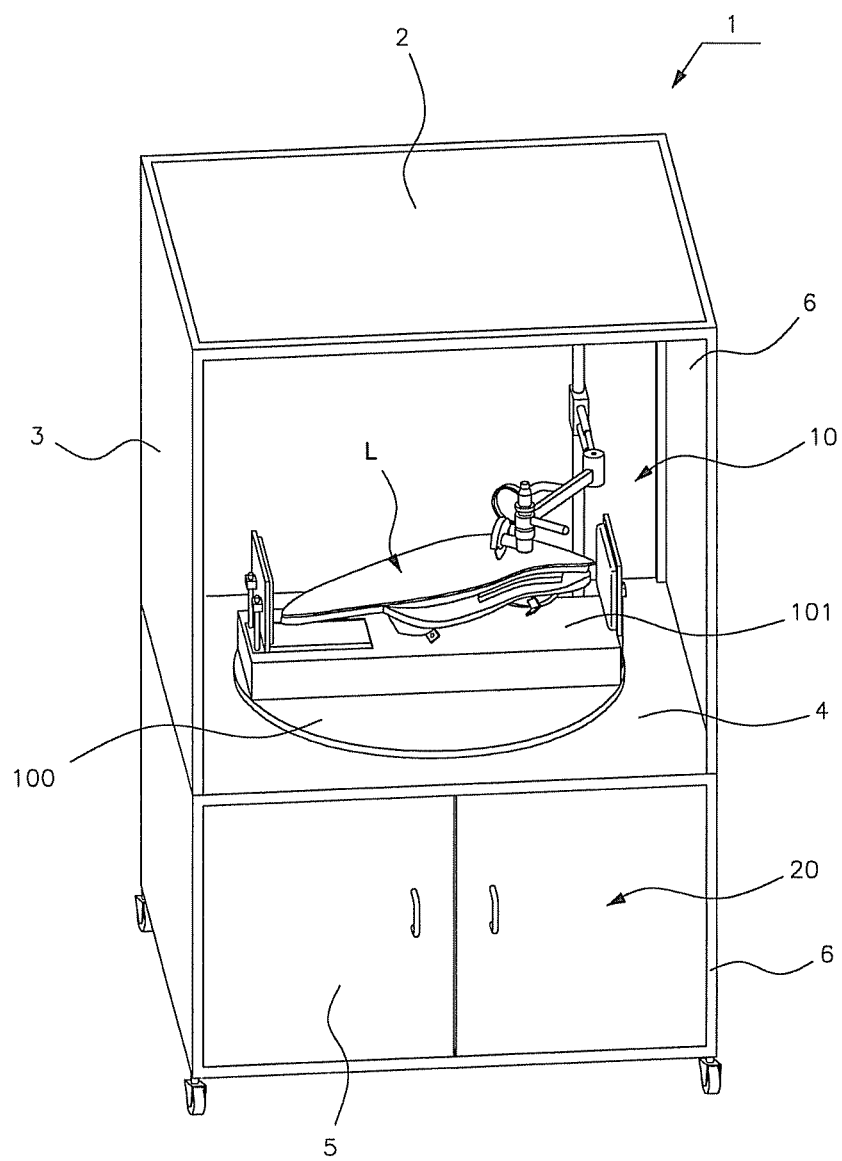
FIG. 1 is an exemplary view of an apparatus that separates a lamp according to an exemplary embodiment of the present invention.
Figure 2:
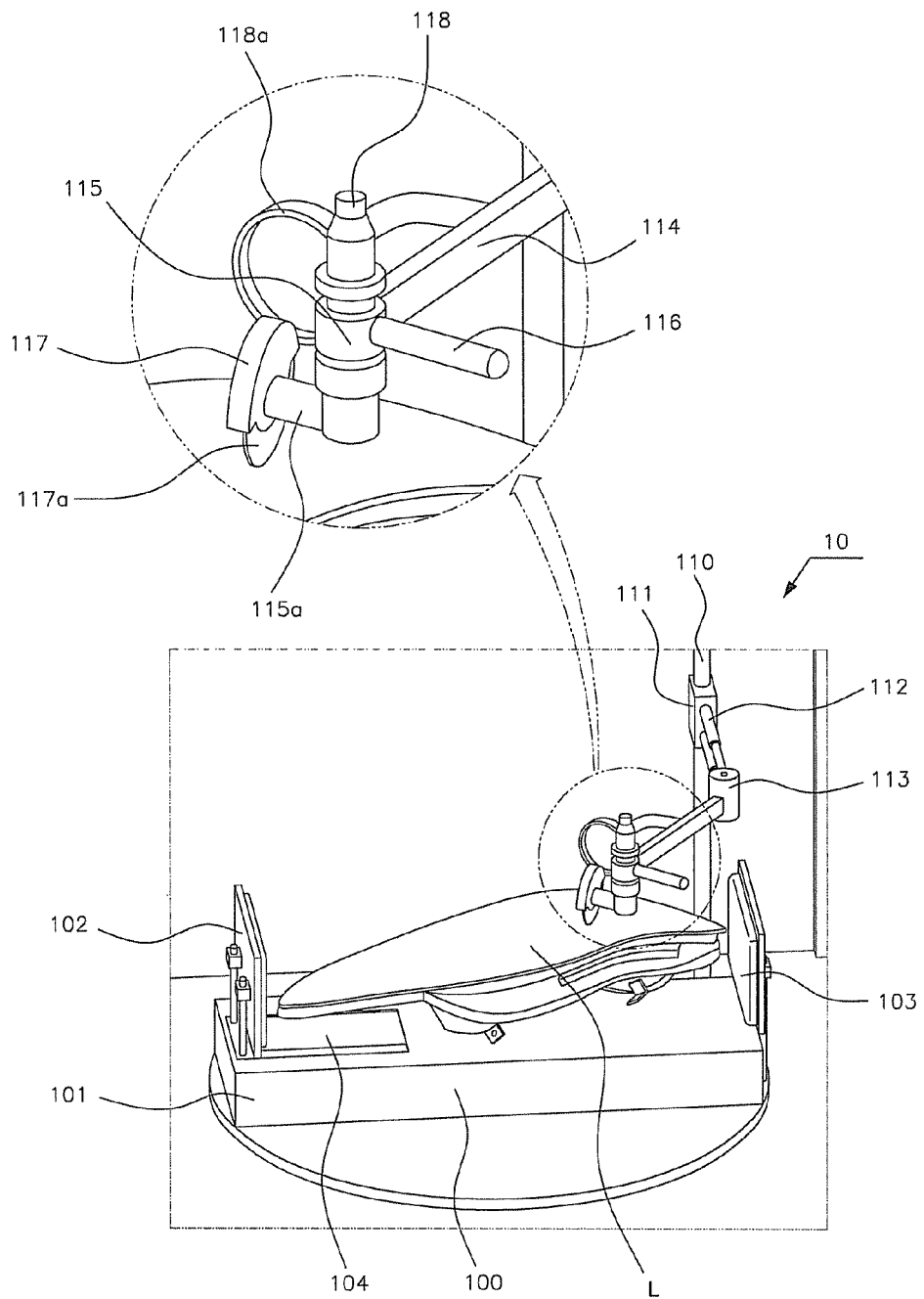
FIG. 2 is an exemplary detailed view of a separating unit of an apparatus that separates a lamp according to an exemplary embodiment of the present invention.
Figure 3:
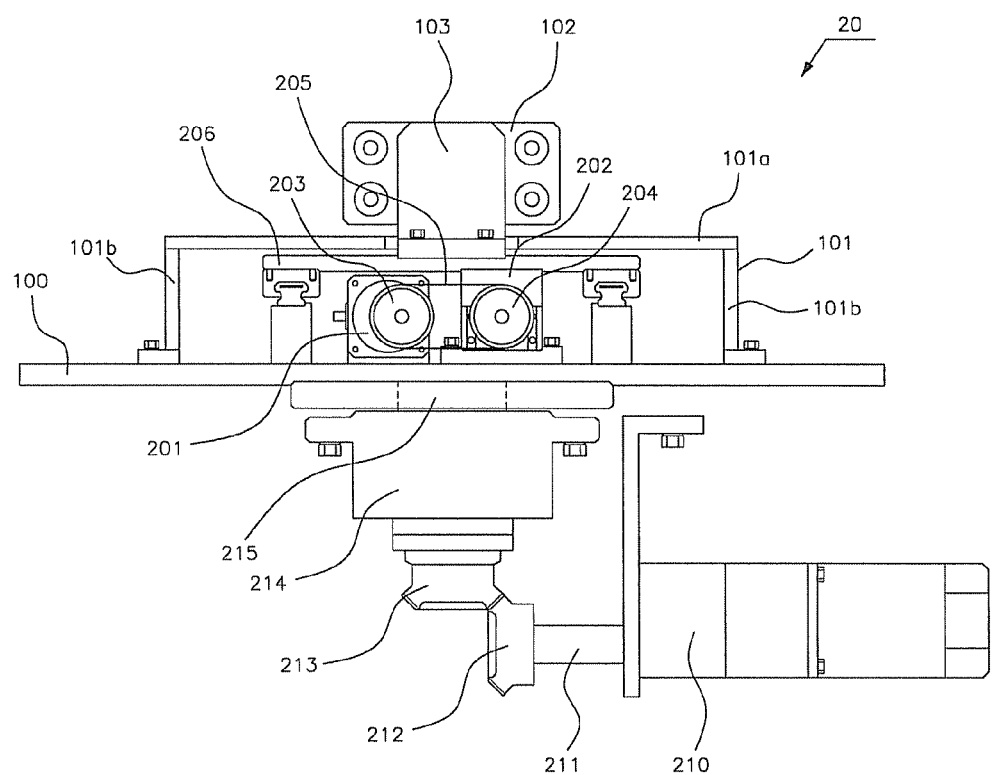
FIG. 3 is an exemplary detailed view of a power unit of an apparatus that separates a lamp according to an exemplary embodiment of the present invention.

FIG. 1. is an exemplary view of an apparatus that separates a lamp according to an exemplary embodiment of the present invention, FIG. 2 is an exemplary detailed view of a separating unit of the apparatus that separates a lamp according to an exemplary embodiment of the present invention, and FIG. 3 is an exemplary detailed view of a power unit of the apparatus that separates a lamp according to an exemplary embodiment of the present invention.

First, referring to FIG. 1, in the apparatus 1 that separates a lamp according to an exemplary embodiment of the present invention, a separating unit 10 that separates a lamp L is disposed at an upper portion of the apparatus, and a driving unit 20 in which a motor for rotating a rotating plate 100 installed at the separating unit 10 and a motor for moving a first clamp 102 are installed is disposed at a lower portion of the apparatus.

An exterior appearance of the apparatus 1 that separates a lamp according to an exemplary embodiment of the present invention may have a box shape that has a structure in which the driving unit 20 may be installed within a power chamber 6, each lateral surface 3 may be installed at both sides of an upper portion of the power chamber 6, and a ceiling surface 2 may be mounted at an upper portion of the lateral surfaces 3. In particular, an upper plate of the power chamber 6 may have a flat plate shape and may form a work table 4 where an operation of separating a lamp according to an exemplary embodiment of the present invention may be performed.

The rotating plate 100, which may be rotated by a rotating plate driving motor 210 that will be described below, may be installed on the work table 4, a base 101 on which the lamp L to be separated is mounted may be attached to the rotating plate 100, and a first clamp 102 and a second clamp 103, which stably fix the lamp L mounted on the base 101, may be installed on the base 101. Specifically, the first clamp 102 may be moved in a direction toward the second clamp 103 to be adjacent to the second clamp 103 or a direction away from the second clamp 103, via a plate 104 which may be rotated on the base 101 in forward and backward directions (e.g., horizontal directions) by a clamp driving motor 201 that will be described below.

In addition, a support rod 110 may be installed between the work table 4 on which the rotating plate 100 is installed and an inner side of the ceiling surface 2, a coupler 111, which may be moved in upward and downward directions (e.g., vertical directions), may be inserted onto the support rod 110, a connecting rod 112 extended perpendicular to the support rod 110 may be attached to the coupler 111, and a rotating shaft 113, which may rotate a tool arm 114, to which a tool for cutting the lamp L is attached, in left and right directions (e.g. horizontal directions), may be installed at an end of the connecting rod 112.

Further, a fixing chuck 115 that fixes the tool may be attached to the end of the tool arm 114, and a cutting tool 117 that cuts the lamp L may be attached to a fixing chuck arm 115a formed at the fixing chuck 115. Cutting tools having various shapes may be attached to the cutting tool 117, and a cutting blade 117a having a shape of a rotating circular disc may be attached in an exemplary embodiment of the present invention.

Meanwhile, a suction device 118 may be installed at an outer circumference of the fixing chuck 115 to suction dust, which scatters from a portion of the cutting blade 117a during cutting of the lamp L, via a suction pipe 118a. In addition, a configuration of the power unit 20 of the apparatus 1 that separates a lamp according to an exemplary embodiment of the present invention is as follows.

The power unit 20 may include the clamp driving motor 201 that moves the first clamp 102, and the base 101 may be formed in a box shape having the rotating plate 100 as a bottom surface, both side plates 101b disposed on the rotating plate 100, and a base upper plate 101a mounted at an upper portion of both side plates 101b. The clamp driving motor 201 may be disposed between the base upper plate 101a and the rotating plate 100, rotational force of a driving pulley 203 coupled to a shaft of the clamp driving motor 201 may be transmitted to a driven pulley 204 via a belt 205 connected to the driving pulley, a direction change block 202, which converts rotational force of the shaft of the clamp driving motor 201, may be rotated by rotational force of the driven pulley 204, and a guide bar 206 connected to the direction change block 202 may be moved by the rotation of the direction change block 202.

Further, the plate 104 attached to the guide bar 206 may be moved on the base 101 in forward and backward directions (e.g., horizontal directions) via the movement of the guide bar 206, and therefore the first clamp 102 may be moved on the base 101 in forward and backward directions along the plate 104.

In addition, the rotating plate driving motor 210 that provides driving force for rotating the rotating plate 100 may be installed at the power unit 20, and a driving gear 212 coupled to a shaft 211 of the rotating plate driving motor 210 and a rotating shaft block 214 having a rotating shaft 215 therein to which a change gear 213, which converts a horizontal directional rotation of the shaft 211 of the rotating plate driving motor 210 into rotational force in a vertical direction by being thread engaged with the driving gear 212, is mounted may be installed at the power unit 20, respectively.

Hereinafter, an operation of the apparatus that separates a lamp according to an exemplary embodiment of the present invention, which is configured as described above, will be described.

First, the lamp L to be separated may be mounted on the base 101, and the first clamp 102 may be moved by driving the clamp driving motor 201, thereby stably fixing the lamp L between the first clamp 102 and the second clamp 103. Next, an operator may adjust the coupler 111 coupled to the support rod 110 in upward and downward directions and the rotating shaft 113 coupled to the end of the connecting rod 112 in left and right directions to allow the cutting tool 117 attached to the fixing chuck 115 to be closer to the lamp L stably fixed between the first clamp 102 and the second clamp 103.

Thereafter, the operator may separate a front side lens part by cutting out a front side portion of the lamp L using the cutting blade 117a attached to the cutting tool 117 while gripping the tool arm 114 attached to the fixing chuck 115, and may separate a lens part and the housing from each other by cutting and dismantling the housing after reversing the lamp L to expose a side of the housing.

Therefore, a front side lens, which is made of a polycarbonate (PC) material, and the housing of the lamp L, which is made of a polypropylene (PP), may be easily separated from each other, and high priced engineering plastics may be obtained by separating a bezel, a reflective plate, or the like, which is installed in the lens, using the cutting tool 117.

Furthermore, the operator may rotate the rotating plate 100 by driving the rotating plate driving motor 210 based on a shape of the lamp L, and allows dust generated during the operation of separating the lamp to be suctioned through the suction pipe 118a by operating the suction device 118 attached to the outer circumference of the fixing chuck 115, thereby making the process of separating the lamp easier and securing safety of the operation.

Moreover, the apparatus that separates a lamp according to the exemplary embodiment of the present invention may prevent a sealant, which is an adhesive material, from remaining on the lamp by cutting and dismantling the front side lens and an end portion of the housing disposed at a rear side of the lens, as described above.

Accordingly, the high priced engineering plastics such as PC, ABS, PBT, PMMA, or the like, which are used in the lamp L, may be easily obtained by performing the process of separating the lamp using the apparatus for separating a lamp according to the exemplary embodiment of the present invention.

What is claimed is:

1. An apparatus that separates a lamp of a vehicle, comprising:
   a separating unit configured to separate a lamp; and
   a driving unit installed within a power chamber disposed at a lower portion of the separating unit and having a motor that moves a rotating plate installed at the separating unit and a first clamp,
   wherein the rotating plate is installed on a work table of an upper plate of the power chamber,
   wherein a base on which the lamp to be separated is mounted is attached to the rotating plate,
   wherein the first clamp and a second clamp, which stably fix the lamp mounted on the base, are installed on the base,
   wherein a support rod is installed on the work table,
   wherein a coupler, which is movable in upward and downward directions, is installed onto the support rod, and
   wherein a cutting tool, which cuts the lamp, is attached to the coupler.

2. The apparatus of claim 1, wherein a connecting rod extended perpendicular to the support rod is attached to the coupler, a rotating shaft that rotates a tool arm for attaching the cutting tool in left and right directions is installed at an end of the connecting rod, a fixing chuck that fixes a tool is attached to an end of the tool arm, and the cutting tool is attached to the fixing chuck.

3. The apparatus of claim 2, wherein a suction device that suctions dust, which scatters during a process of cutting the lamp, is installed at an outer circumference of the fixing chuck.

4. The apparatus of claim 1, wherein the driving unit includes a clamp driving motor, and the first clamp to which a plate is attached is moved when the plate coupled to a guide bar, which is moved based on a rotation of the clamp driving motor, is moved on the base.

5. The apparatus of claim 1, wherein a rotating plate driving motor is installed at the driving unit, and the rotating plate is rotated by a rotation of a driving gear coupled to a shaft of the rotating plate driving motor and a rotation of a rotating shaft at which a change gear, which is thread engaged with the driving gear, is mounted.

* * * * *